United States Patent Office 2,848,417
Patented Aug. 19, 1958

2,848,417

EXTREME HIGH TEMPERATURE GREASE COMPOSITIONS

Jack W. Armstrong, Concord, and Harold A. Woods, Martinez, Calif., assignors to Shell Development Company, New York, N. Y., a corporation of Delaware No Drawing. Application August 15, 1955
Serial No. 528,551

8 Claims. (Cl. 252—42.1)

This invention relates to grease compositions and is particularly concerned with the production of greases especially useful not only at ordinary temperatures but also at extremely high operating temperatures and which are, at the same time, resistant to disintegration in the presence of water.

Greases especially designed for operation above the melting points of soaps (which are normally employed for grease forming) have comprised amorphous colloids, such as silica or colloidal natural products such as clay. Since both of these materials are hydrophilic, the presence of water causes the separation of the inorganic gelling agent from the lubricating oil and hence the destruction of the grease consistency. Attempts have been made in the past to provide the gelling agents with hydrophobic properties, such as by the incorporation of a high molecular weight hydrophobic cationic surface-active agent, which is either absorbed upon or reacted with the surface of the inorganic colloid. Other means of stabilizing the greases have been absorption of siloxane films or the surface esterification of acidic colloids such as silica.

Most of these greases are useful only at ordinary operating temperatures such as those encountered in normal automotive equipment and the like. When utilized in the proportions recommended by the art, the greases are not only stable with respect to disintegration in the presence of water, but also have satisfactory thermal stability as long as automotive operating conditions are not exceeded. However, it has been found that when temperatures above about 400° F. are encountered during the use of such greases one or another of the components of the grease decomposes thus resulting in the destruction of the grease composition or in the degradation or elimination of lubricating properties thereof. Several attempts have been made to overcome this instability at elevated operating temperatures, such as by the incorporation of thermoplastic resins as the waterproofing agent. While this improves the operating range to a certain extent, it has been found that such greases are still not capable of operating for any effective length of time at temperatures appreciably above 400° F. Even when utilizing such resins as oil-modified alkyds, high temperature operation has been found to be completely unsatisfactory.

Another attempt made to satisfy the extreme physical requirements for high temperature greases is described in the Brannen et al. patent—U. S. 2,679,480. This patent suggests the use of indogen compounds as gelling agents for lubricating oils, especially silicones. While the greases made from these two ingredients have good high temperature properties, the life of the grease has been found to be limited, the compositions failing to lubricate after a certain length of time. Hence, it would be desirable to find new lubricants or gelling agents which would materially increase the life of the grease capable of lubricating ball bearings and the like at extreme high temperatures for more extended periods of time.

It is an object of the present invention to provide new grease compositions. It is another object of this invention to provide grease compositions especially suitable for operation at extremely high operating temperatures. It is a further object of this invention to provide grease compositions which are not only stable at high temperature but also resistant to disintegration in the presence of water. An important object of this invention is to provide grease compositions having the ability to resist the degradation influences occurring at high temperatures during lubrication of metallic equipment, said greases being capable of so performing for periods greater than that possible by the use of indogen thickening agents in silicone oils. Other objects will become apparent during the following description.

Now, in accordance with the present invention, it has been found that high melting (melting points over 250° F.) indanthrene compounds may be employed to thicken various oleaginous vehicles to produce greases which have outstanding stability and display excellent lubricating properties at elevated temperatures. More particularly, and especially for use at temperatures in excess of 400–450° F., it has been found that greases having exceptionally high stability are those comprising silicone lubricants thickened to a grease consistency by the presence of from about 10% to about 60% by weight, based on the total composition, of the indanthrene compound. Still more particularly, the most effective indanthrene compound for the present purpose is indanthrone, the most suitable silicone fluid being a methyl phenyl silicone polymer oil having a lubricating oil viscosity. For the present purpose it has been ascertained that it is best to employ the indanthrene compounds in their non-metallic form, that is, without neutralization of the carbonyl groups in said compounds with such ions as sodium, potassium, calcium, etc. While it is possible to employ the partially or fully neutralized indanthrene compounds as grease thickening agents, greases having maximum lubricating life at elevated temperatures are those in which the carbonyl groups are free of any metallic substituents. Typical indanthrene compounds suitable for the present purpose include the following:

Indanthrene Blue (Indanthrone)
Indanthrene Yellow G (Flavanthrone)
Indanthrene Golden Orange (Pyranthrone)
Indanthrene Yellow GK
Indanthrene Dark Blue BO (Violanthrone)
Indanthrene Blue BCS (3,3'-dichloroindanthrene)
Indanthrene GCD (3-chloroindanthrene)
Indanthrene Blue R
Indanthrene Blue RSA The indanthrene dyes, which are used as the gelling agents in the subject greases, contain two units of the following essential typical grouping per molecule:

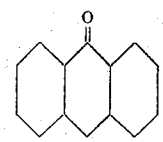

The tricyclic radical, it will be noted, has at least one carbonyl radical on the middle ring of the entire group. Some specific members of the indanthrene compound such as indanthrone have two such carbonyl radicals attached to the middle ring. Others, such as flavanthrene, contain the single essential carbonyl radical, the tricyclic group being linked to a second such group by means of nitrogen linkages, or (as in the case of pyranthrone) through unsaturated hydrocarbon linkages. Thus, the two tricyclic nuclei may be linked by two —N= groups (as in flavanthrene); by two —NH— groups (as in indanthrene blue); by two =CH— groups (as in pyranthrone); or by intervening condensed ring systems (as in violanthrone). Another characteristic of the indanthrene dyes is that nitrogen is not a nuclear element present in the rings making up the essential tricyclic nuclei.

The above compounds are to be mixed with the lubricating oils either by milling or other shearing action to produce grease compositions, the latter containing from about 10 to about 60% by weight of the indanthrene compound. The greases may be modified by the presence of other gelling agents known for their ability to resist distintegration at elevated temperatures, such as silica gel or other similar amorphous colloids including silica-alumina, silica-magnesia, and the like, as well as clay-like colloids including especially bentonite and hectorite dispersed as known in the art in a form capable of forming grease compositions. These inorganic gelling agents may be used without further modification or may bear on their surfaces materials capable of imparting thereto an oleophilic character, thus providing the colloids with a water-resistant feature suitable when water is present or apt to occur as a contaminating environment during the use of the grease for lubricating purposes. Such greases have been described in the art.

Certain high temperature soap grease compositions can be improved with respect to their maximum operating temperatures by incorporation of at least 50% by weight (based on the total gelling agent) of the subject indanthrene dyes. Especially amenable to this improvement are the greases gelled with soaps (preferably alkali metal, e. g. sodium) of aliphatic monocarboxylic acids having at least 20 carbon atoms per molecule, such as the sodium soaps of beeswax acid or of degras and the like. These greases may contain further high temperature improving agents, such as alkali metal salts of aromatic carboxylic acids, e. g. sodium benzoate. The latter are generally present in minor amounts based on the aliphatic soaps. Suitable compositions of this type are shown in Woods et al. patent—U. S. 2,676,149.

While the present invention is especially directed to extreme high temperature lubricating greases, they may be employed for normal operating conditions as well. Hence, and especially useful at these operating conditions below about 400° F., any of the well-known lubricating oils may be utilized. These include mineral oil lubricants and synthetic lubricating oils of known types, such as the phosphorus esters, silicon esters and aliphatic esters formed by esterification of aliphatic dicarboxylic acids with monohydric alcohols. Typical species of these materials include tricresylphosphate, dioctylphthalate, bis(2-ethylhexyl)sebacate, tetra(2-ethylhexyl)silicate, and the like.

Lubricants to be employed at temperatures in excess of about 400° F. are those having an inherent high thermal stability including the halocarbons and organosilicon fluids. The halocarbons may be those described in Peterson et al. patent, U. S. 2,679,479, and include especially the fluorocarbon oils, preferably distilling above about 200° C. at atmospheric pressure. The most useful class of lubricants for grease compositions to be utilized at temperatures in excess of about 400° F. include the organo-substituted silicon fluids of lubricating oil viscosity. Liquid organo-silicon polymers which are adapted for the preparation of the subject high temperature grease compositions may be obtained by the hydrolysis and chemical condensation of one or more hydrolyzable silicon compounds having the general formula $R_2SiX_2$, wherein R is a lower alkyl radical and X is a hydrolyzable group selected from the class consisting of halogen and alkoxy groups. They may also be obtained by the hydrolysis and chemical condensation of a mixture of alkylated silicon compounds containing at least 75 mol percent of such dialkyl silicon compound having the general formula $R_2SiX_2$ and not more than 25 mol percent of a monoalkyl silicon compound having the formula $RSiX_3$, or a total of not more than 25 mol percent of both such monoalkyl silicon compound and a trialkyl silicon compound having the formula $R_3SiX$. In all of these formulas, R and X have the meanings stated above. In general, the hydrolyzable silicon compound or mixture of such compounds from which the liquid organo-silicon polymers may be prepared is one having an average composition corresponding to the formula $R_{4-z}SiX_z$, wherein $z$ is a whole or a fractional number from 2.25 to 1.5 and R and X have the meanings given above.

Examples of hydrolyzable dialkyl silicon compounds which may be used in preparing the liquid organo-silicon polymers are dimethyl silicon dichloride, methyl ethyl silicon dichloride, diethyl silicon dichloride, methyl propyl silicon dichloride, dimethyl silicon dibromide, diethyl silicon dibromide, dimethyl-dimethoxy-silicon, diethyldiethoxy - silicon, dimethyl - diethoxy - silicon, etc. Examples of hydrolyzable monoalkyl silicon compounds and hydrolyzable trialkyl silicon compounds which may be present together with the dialkyl silicon compound in amount not exceeding 25 mol percent of the mixture are methyl silicon trichloride, ethyl silicon tribromide, ethyl silicon trichloride, propyl silicon trichloride, methyl-trimethoxy-silicon, methyl-triethoxy-silicon, ethyl-triethoxy-silicon, trimethyl silicon chloride, trimethyl silicon bromide, triethyl silicon chloride, trimethyl-methoxy-silicon, trimethyl-ethoxy-silicon, triethyl-ethoxy-silicon, etc.

For purposes of the present invention only those polymers which are high boiling liquids within the lubricating oil viscosity range are suitable, these generally possessing a viscosity at 100° F. which is within the range of from about 25 to about 3500 SSU. It is preferred, for purposes hereof, to employ such oils as have a viscosity at 100° F. of from about 300 SSU to about 1250 SSU. Such products are generally colorless and inert, have a very low volatility and undergo relatively slight change in viscosity for a given change in temperature. Relatively common oils of this type are dimethylsilicone polymer, phenylmethylsilicone polymer, chlorophenylmethylsilicone polymer, etc., it being preferred to employ the phenylmethylsilicone polymer in accordance herewith. Methods of preparing such compounds are taught in numerous patents, e. g. U. S. 2,410,346, U. S. 2,456,496, and in the literature such as "Chemistry of the Silicones," by Rochow, page 61, et seq. A particularly desirable phenylmethylsilicone polymer for use in accordance with the present invention is Dow-Corning 550 silicone fluid, a product of Dow-Corning, Inc., which has a viscosity at 100° F. of about 300 to about 400 SSU. Other suitable types of silicone oils include halogen substituted silicones, such as chlorinated or fluorinated silicones. Two commercial products of this type are GE 84106, sold by General Electric Company, and DC-F-4050 sold by Dow-Corning, Inc.

Greases of the present invention may be produced by any of the useful grease-making techniques, such as mixing thickener and oil and then milling the mixture in a colloid mill, three-roll mill, etc. The thickener may be added to the vehicle as such or the reactants may be added and the thickener produced in situ.

A typical grease of the present invention was prepared by mixing 70 grams of DC 550 silicon oil product (methylphenylsilicon polymer oil product of Dow-Corning, Inc., having a methylphenyl ratio of about 0.6 and a viscosity in the range of from about 300 to about 400 SSU at 100° F.) with 143.5 grams of a 20.9% (by weight) aqueous paste of indanthrone. The mixture was stirred in a beaker with high speed stirring on a steam bath until the majority of water had been removed. It was then passed through a three-roll paint mill and heated in a forced draft oven for three hours at 450° F. The essentially dry paste was hard and grainy but milled to a smooth consistency of a No. 1 grade grease. It was tested in the ABEC–NLGI high speed-high temperature bearing test (hereinafter described in detail) at 450° F.

and 10,000 R. P. M. Running in cycles of 20 hours operating and 4 hours at rest, the grease lubricated the bearing for 850 hours before failure.

The bearing test referred to above is a tentative one adopted by the Coordinating Research Council during the last World War and is generally referred to as the ABEC–NLGI test. It is conducted as follows: 3.2 cc. of grease are placed in each of two bearings disposed on the test spindle. One bearing, a special heat treated precision Marlin-Rockwell 204–S–17 high speed tool steel, silver plated bronze cage bearing, is subjected to a temperature of 450° F. in an oven; the other bearing, a standard New Departure 204 bearing, is approximately at room temperature. Temperature is determined by a thermocouple inserted through the bearing housing and contacting the outer race of the test bearing. Failure is adjudged to occur when the bearing cannot be rotated by the one-inch wide fabric drive belt at the beginning of a test cycle (the test is conducted in cycles of 20 hours operating and 4 hours at rest).

The paste preparation comprising 20.9% indanthrone is a commercially available product of General Dyestuffs Corporation. The paste comprises 20.9% of the dye, the balance being water. This material may be employed satisfactorily in the preparation of greases as indicated, or the pure anhydrous dye, not in paste form, may be employed.

For use at lower temperatures oleaginous vehicles other than the silicons may be utilized. The greases are prepared in essentially the same way as that described above. Additional ingredients may be present, such as anti-oxidants, anti-corrosion agents, extreme pressure additives, etc.

We claim as our invention:

1. A grease composition having lubricating properties which comprises a major proportion of an oleaginous lubricating liquid and between about 10% and about 60%, by weight, of an indanthrene compound melting above about 250° F. said liquid and compound being milled sufficiently to produce a composition of grease-like consistency.

2. A lubricant grease of claim 1 wherein the lubricant vehicle comprises a silicone polymer oil in the lubricating oil viscosity range.

3. A lubricant grease of claim 2 wherein the lubricant vehicle comprises a methyl phenyl silicone polymer oil.

4. A composition according to claim 1 containing in addition a minor amount, relative to the indanthrene compound, of a complex soap comprising a sodium soap of an aliphatic monocarboxylic acid having at least 20 carbon atoms per molecule and an alkali metal salt of an aromatic carboxylic acid.

5. A lubricant grease comprising essentially a lubricant vehicle thickened with an amount of from about 10% to 60% by weight of indanthrene, said lubricant and indanthrene being milled sufficiently to produce a grease structure.

6. A lubricant grease of claim 5 wherein the lubricant vehicle is a silicone-polymer oil in the lubricating oil viscosity range.

7. A lubricant grease of claim 6 wherein the silicone polymer oil is a methyl phenyl silicone.

8. A grease composition having a grease structure and lubricating properties which comprises from about 10% to about 60% of an indanthrene dye compound and a proportion greater than 40% of an oleaginous lubricating liquid of the group consisting of phosphorus esters, silicic acid esters, esters of aliphatic dicarboxylic acids with monohydric aliphatic alcohols, organo-silicon fluids, halocarbon fluids and mixtures of the same.

References Cited in the file of this patent

UNITED STATES PATENTS

| | | |
|---|---|---|
| 2,136,885 | Moser et al. | Nov. 15, 1938 |
| 2,676,149 | Woods et al. | Apr. 20, 1954 |